July 17, 1973 — A. L. MICHAUD — 3,746,516

SOLE PLATE FOR FLUIDIZED BED REACTOR

Filed March 10, 1971

Inventor
ANDRE LOUIS MICHAU
By Albert C. Johnston
Attorney

United States Patent Office 3,746,516
Patented July 17, 1973

3,746,516
SOLE PLATE FOR FLUIDIZED BED REACTOR
André Louis Michaud, Vieux Thann, France, assignor to Fabriques de Produits Chimiques de Thann et de Mulhouse, Haut-Rhin, France
Filed Mar. 10, 1971, Ser. No. 122,790
Claims priority, application Great Britain, Mar. 10, 1970, 11,499/70
Int. Cl. B01j 9/18; B05b 1/14
U.S. Cl. 23—291
8 Claims

ABSTRACT OF THE DISCLOSURE

A support plate for a fluidized bed reactor has internally located chambers, each provided with at least one inlet and outlet conduit which are not in line with one another; the plate face which will be in contact with the fluidised bed is substantially flat and the inlet conduit opens into the chamber inwardly of the associated chamber walls to provide a trap zone surrounding the inlet conduit which will hold any solid particles entering the chamber and prevent them from hindering the flow of gas through the plate. The chambers and conduits may be of stainless steel embedded in refractory concrete. The plate may be used in the chlorination of titanium ores.

---

This invention relates to an improved sole plate for a fluidised bed reactor and is particularly concerned with a perforated plate of improved design which can be used to support a fluidised bed of particulate solid in a gas/solid fluidised bed reaction.

Fluidised bed reactions are of great importance in industrial chemistry and many designs of reactor have been proposed. In such reactors, a bed of particulate solid is supported on a sole plate in the reactor and the bed is fluidised by the upward passage of gas which passes from a wind box below the plate through the plate and into the bed. The gaseous reactant may be used as the fluidising gas, or alternatively separate reacting and fluidising gases may be used, and gaseous reaction products pass out of the reaction vessel through an exit conduit located towards the upper end of the vessel. One reaction carried out in this manner, and with which the present invention is particularly concerned, is the preparation of titanium tetrachloride by the chlorination of titaniferous minerals, such as rutile or ilmenite, which are introduced, together with particulate coke, as the particulate solid. The gaseous reactants in this reaction tend to be rather corrosive and this places certain limitations on the design of the sole plate through which the gaseous reactants must pass into the fluidised bed.

When the bed is not in a fluidised state or when the fluidisation is stopped or shut down the particulate solid, especially the fine particles, can fall into and cause blockages in the gas passageways in the sole plate.

During the course of the reaction, as a result of the movement of the particulate solids in the fluidised bed, further very finely divided solids are produced and these so-called fines can become lodged in the gas passageways of the sole plate and so interrupt the smooth running of the fluidised bed reaction.

The present invention is concerned with a new design of sole plate having a solids trap located integrally within the plate in a manner such that fines can be accumulated in this solids trap without interfering with the fluid flow patterns set up in the reactor and without blocking the gas passageways.

The present invention provides a plate adapted to support a bed of particulate solid in a gas/solid fluidised bed reactor having a plurality of chambers each located internally in the plate and each being provided with at least one inlet conduit for the passage of fluidising gas leading from a first side of the plate to the chamber and at least one exit conduit, not on the line of an inlet conduit, leading from the chamber to a second side of the plate which is substantially flat, the inlet conduit opening into the chamber inwardly of the associated chamber walls to provide a trap zone surrounding the inlet conduit to trap any particulate solid entering the chamber so that it will not hinder the passage of gas through the conduits and chamber.

The inlet and outlet conduits are positioned such that one is not on the line of the other, in other words, some lateral displacement is provided. This lateral displacement can be conveniently introduced by providing one inlet conduit to each chamber and two outlet conduits from each chamber, neither outlet conduit being on the line of the inlet conduit. It is of course, also possible to provide more than one inlet conduit per chamber and more than two outlet conduits per chamber but the same considerations apply regarding lateral displacement of inlet and outlet conduits.

Practical considerations make it convenient to use a chamber of circular or rectangular cross-section and in such cases, the inlet conduit can be centrally located with respect to the chamber and penetrate some distance into the interior of the chamber while the exit conduits are positioned on an opposite face of the chamber and towards the outer edges of the opposite face.

The penetration of the inlet conduit into the interior of the chamber ensures that there is a certain volume of the chamber, adjacent to the face through which the inlet conduit penetrates, where accumulated solids may be collected without interfering with the fluid flow patterns through the plate.

It is not necessary that the plates of the present invention be constructed from the ceramic materials customarily used in fluidised bed reactors. The plates of the present invention may be constructed from high temperature resistant concrete materials and the plate may be moulded of such material as one integral unit around with the necessary inlet and outlet conduits and solids trap.

In accordance with a further feature of the present invention, the support plate of the invention may be used in a gas/solid fluidised bed reactor in a process in which the solid particulate bed, supported on the plate, is fluidised by the introduction into the bed of fluidising gas through the conduits and chambers of the plate and any particulate solid from the fluidised bed entering a chamber in the plate is retained, at least while the bed remains fluidised, in the trap zone of the chamber where it does not hinder the passage of fluidising gas through the conduits or chamber.

A specific embodiment of the plate of the present invention will now be described with reference to the following drawings in which.

Figure 1:
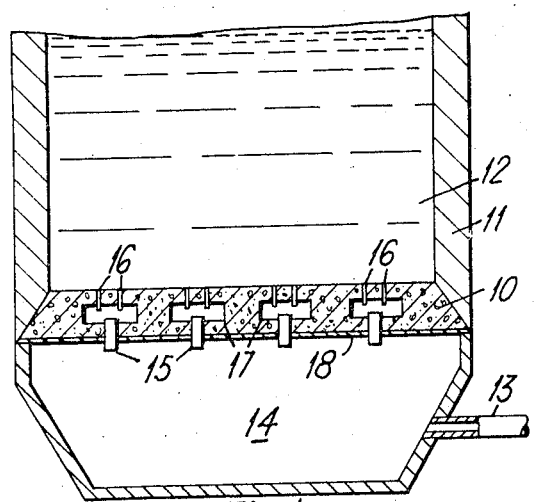
FIG. 1 represents a cut away view of the lower part of a fluidised bed reactor.

The plate 10 may be fitted in the lower end of a fluidised bed reactor 11 in the conventional manner supporting the fluidised bed 12 while gas enters windbox 14 below plate 10 through gas inlet 13 and then passes up through the pores of plate 10 into the bed 12 which becomes fluidised.

Figure 3:
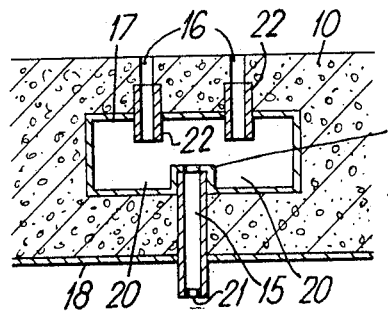
FIG. 3 represents a cut away side view of the plate showing in more detail, the design of one solids trap with associated conduits.

The preferred plate of the present invention is constructed from stainless steel and a high temperature resistant concrete material and comprises generally a series of inlet conduits 15 and exit conduits 16 which communicate with one another through solids trap 17. FIG. 3 shows one such trap together with its associated inlet and outlet conduits and it will be apparent that the whole plate comprises a plurality of such traps and conduits. Trap 17 is of circular or rectangular cross-section and, for convenience, is positioned centrally in the interior of plate 10. Inlet conduit 15 is a stainless steel tube which is soldered to steel support plate 18 and opens centrally into trap 17. Trap 17 is formed from a stainless steel box which is apertured and flanged at 19 to receive inlet conduit 15 so that, prior to the casting of the concrete, trap 17 can rest on the top of conduit 15. The penetration of inlet conduit 15 into trap 17 in the manner shown ensures that that part of the trap 20, adjacent to the wall which is apertured and flanged, can contain the accumulated solids without interfering with the fluid flow patterns set up to the plate. The lower end of conduit 15 which, in the assembled apparatus, penetrates into the windbox 14 is provided with an apertured plug 21, soldered into the end of conduit 15, the size of the aperture being such as to provide, in operation, a pressure drop through the plate which is of the order of 50–350% of the pressure drop through the fluidised bed.

Exit conduit 16 communicates from trap 17 to the upper face of plate 10 which, in operation, is in contact with the fluidised bed. The exit conduits 16 are formed as bores in the concrete plate and run as extensions of stainless steel tubes 22 which are soldered to the upper surface of trap 17 and penetrate a short distance into the trap.

The upper surface of plate 10, which is to be in contact with the fluidised bed, is thus completely flat and devoid of the projections which are found in various prior art plates. Such projections do not last long and require frequent replacement. It has been found that the completely smooth surface on the plates of the present invention provide more satisfactory fluid flow patterns and allow the surface to be scraped if necessary.

The plate of the present invention may be prepared by assembling the necessary metal components together, soldering inlet conduit 15 to support plate 18, soldering apertured plug 21 to the lower end of inlet conduit 15, soldering tubes 22 into the trap 17 and mounting trap 17 on top of exit conduit 15. The required amount of concrete is then introduced onto support plate 18 around the metal components and wooden pegs may be inserted temporarily as extensions of exit tubes 22 to provide the necessary bores through the concrete. The upper surface of the concrete may be smoothed off and, when the concrete is dry, the wooden pegs may be removed leaving the required bore holes leading from trap 17.

The sole plate of the present invention may be used for example in the fluidised bed apparatus of the type described in co-assignee application Ser. No. 664,665, now abandoned in favor of continuation application Ser. No. 43,598, filed June 4, 1970, where it is capable of functioning for long periods of time without blockage and without the need to provide any ancillary equipment to prevent blockage of the gas passageway. The following example is given to illustrate the use of the plate of the present invention in the above-mentioned apparatus.

EXAMPLE

Rutile is chlorinated in a fluidised bed reactor having a sole plate in accordance with the present invention. The apparatus comprises a fluidised bed reactor having an inlet port below the sole plate for the introduction of gaseous chlorine and an inlet port at the top of the fluidised bed reactor for the introduction of solid reactants. An exit conduit from the upper part of the fluidised bed reactor leads to a cyclone separator and gaseous reaction products including titanium tetrachloride are taken off from the upper part of the cyclone separator. Entrained solids which have been separated from the gaseous reaction products are removed from the lower part of the cyclone separator through a recycle conduit which returns the separated solids to the fluidised bed reactor. A diaphram is provided in the recycle conduit having a cross-sectional area of $\frac{1}{4}$ to $\frac{1}{200}$, conveniently $\frac{1}{14}$ that of the gas outlet from the fluidised bed reactor and substantially eliminates the risk of blockage in the recycle conduit.

Figure 2:
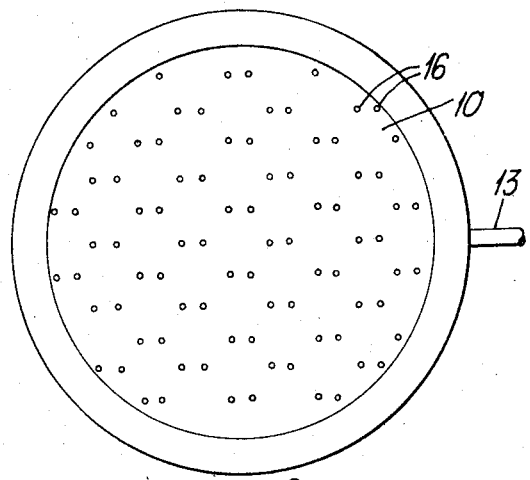
FIG. 2 represents a plan view of the plate.

The fluidised bed reactor is cylindrical, 1400 mm. diameter and 2200 mm. high. Any height between 1400 and 2200 mm. is satisfactory. The fluidised bed reactor is provided with a sole plate 10 as illustrated in FIGS. 1–3 of the accompanying drawing. The plate is made of refractory concrete and is 460 mm. thick. The lower surface contains 31 stainless steel inlet conduits 15, each 26 mm. diameter. Each inlet conduit 15 leads to a solids trap 17 which is a stainless steel cylinder 80 mm. diameter and 45 mm. high. The plate 10 contains 31 such traps and each trap is provided with 2 stainless steel exit conduits 16, each 8 mm. in diameter. The bottom of each inlet conduit 15 is plugged with a stainless steel plug 21 having an orifice of diameter 6 mm. This ensures a good distribution of chlorine gas.

The fluidised bed reactor is charged with 70:30 mixture by weight of rutile (0.01–0.05 mm. particle size) and coke (0.3–0.1 mm. particle size). The solid reactants are fluidised by the introduction of gaseous chlorine through gas inlet 13, windbox 14 and sole plate 10 at the rate of 1100 kg. per hour (360 Nm$^3$/hr. of 95% by volume chlorine measured at 0° C. and 760 mm. Hg pressure) at a temperature of 25° C. and a pressure of 500–800 g./cm.$^2$. The fluidised bed is operated at 1100° C. and produces titanium tetrachloride at the rate of 1380 kg. per hour.

When the reactor is started up, the total pressure drop through the reactor is 36 cm. of mercury; the pressure drop is 13 cm. through the fluidised bed and 23 cm. through the plate. This pressure drop increases during the first 3 weeks of operation of the reactor until it reaches a total drop of 59 cm.; the pressure drop is then 22 cm. through the bed and 37 cm. through the plate. The pressure drop stabilises itself after 3 weeks continuous operation at a total value of 59 cm. mercury and remains at this level for the remainder of the 5 months continuous operation. The initial increase in pressure drop does not affect the production rate of TiCl$_4$ which remains substantially constant at 1380 kg. per hour throughout a 5-month period of continuous operation.

I claim:

1. A plate, adapted to fit over a windbox and support a bed of particulate solid titaniferous ore in a chlorine/particulate titaniferous ore fluidized bed reactor, consisting essentially of a plurality of chambers each located internally in the plate and each being provided with at least one inlet conduit for the passage of chlorine gas and leading from a first side of the plate into the chamber and at least one exit conduit, not on the line of an inlet conduit, leading from the chamber to a second side of the plate, said second side being substantially flat, each said exit conduit opening in a direction generally away from but not projecting beyond said substantially flat side, each said inlet conduit opening into the associated chamber inwardly of the associated chamber walls to provide a trap zone surrounding the inlet conduit to trap any particulate solids entering the chamber so that such solids will not hinder the passage of chlorine gas through the conduits and chamber.

2. A plate according to claim 1 wherein each chamber is provided with one inlet conduit and two exit conduits.

3. A plate according to claim 1 wherein that face of the chamber surrounding the inlet conduit is apertured and flanged so that the apertured and flanged portion can receive the inlet conduit and abut the inlet conduit at the flanged portion.

4. A plate according to claim 1 wherein that end of each inlet conduit remote from the chamber is provided with a non-removable plug which is apertured to permit a predetermined pressure drop across the plate during operation of the plate in a fluidised bed reactor.

5. A plate according to claim 3 having steel inlet conduits penetrating through and soldered to an apertured steel support, an apertured and flanged steel chamber positioned on the inlet conduit such that the inlet conduit is received into the apertured portion of the chamber and abuts the flanged portion of the chamber, two steel exit conduits penetrating through and soldered to the face of the chamber opposite to that receiving the inlet conduit, the assembled conduits and chambers being embedded in a refractory concrete which is apertured to provide extensions of the exit conduits leading to the surface of the refractory concrete.

6. A plate according to claim 1 wherein the chamber is circular or rectangular in cross-section.

7. A plate according to claim 5 wherein the chamber is circular or rectangular in cross-section.

8. A plate according to claim 5 wherein the chamber is cylindrical in shape, has one inlet conduit and two exit conduits and wherein that end of the inlet conduit remote from the chamber is provided with a non-removable plug which is apertured to permit a predetermined pressure drop across the plate during operation of the plate in a fluidised bed reactor.

References Cited

UNITED STATES PATENTS 3,404,845  10/1968  Schmeling et al. ____ 23—284 X

FOREIGN PATENTS 801,421  9/1958  Great Britain_____ 23—284
900,066  7/1962  Great Britain _____ 23—284.3

JAMES H. TAYMAN, Jr., Primary Examiner

U.S. Cl. X.R.

23—284, 288 S; 34—57 A; 263—21 A; 423—659.74; 239—556